(12) United States Patent
Reis et al.

(10) Patent No.: US 7,357,564 B2
(45) Date of Patent: Apr. 15, 2008

(54) APPARATUS FOR PUMPING AND MIXING HIGH AGGREGATE PLURAL COMPONENTS OF DIFFERING VISCOSITIES

(75) Inventors: Thomas E. Reis, Portsmouth, NH (US); Andrew R. Kelly, South Yarmouth, MA (US); Paul G. Reis, Wilmington, DE (US); Robert G. Reis, Parkesburg, PA (US)

(73) Assignee: Substructure Encapsulation Technologies, Inc., Portsmouth, NH (US)

( * ) Notice: Subject to any disclaimer, the term of this patent is extended or adjusted under 35 U.S.C. 154(b) by 486 days.

(21) Appl. No.: 10/907,351

(22) Filed: Mar. 30, 2005

(65) Prior Publication Data

US 2006/0221763 A1    Oct. 5, 2006

(51) Int. Cl.
*B01F 5/06* (2006.01)
*B01F 7/08* (2006.01)
*B01F 15/02* (2006.01)
*B01F 15/06* (2006.01)

(52) U.S. Cl. .............. 366/160.4; 366/181.5; 366/190; 366/310; 366/320; 366/336; 366/297

(58) Field of Classification Search ........ 366/190, 366/310, 320, 149, 160.4, 181.5
See application file for complete search history.

(56) References Cited

U.S. PATENT DOCUMENTS

| 4,135,870 A | * | 1/1979 | Wallace et al. ............ 425/130 |
| 4,733,607 A | * | 3/1988 | Star et al. .................... 99/348 |
| 4,747,342 A | * | 5/1988 | Schack et al. ............... 99/472 |
| 4,876,896 A |   | 10/1989 | Snow et al. .................. 73/827 |
| 4,993,876 A |   | 2/1991 | Snow et al. ................ 405/216 |
| 5,228,775 A | * | 7/1993 | Horn et al. ................. 366/278 |
| 2006/0221763 A1 | * | 10/2006 | Reis et al. ................. 366/149 |

* cited by examiner

*Primary Examiner*—Tony G. Soohoo
(74) *Attorney, Agent, or Firm*—Phillip E. Decker; Mesmer & Deleault, PLLC

(57) ABSTRACT

An apparatus for pumping and mixing plural components of differing viscosities having at least one hopper for accepting each component, each hopper having a hopper outlet; an auger secured within each hopper, the auger being designed to wipe the inside surface of its respective hopper during rotation; a piston pump plumbed to each hopper outlet, each piston pump being substantially identical and having a pump inlet and a pump outlet, and each piston pump designed to be joined by a coupling yoke, whereby components of differing viscosities can be pumped uniformly; and a static mixer. The static mixer has a mixer inlet and a mixer outlet, and is designed so that plural components of differing viscosities can be uniformly pumped and mixed.

14 Claims, 18 Drawing Sheets

9.1, 9A.1

9, 9A

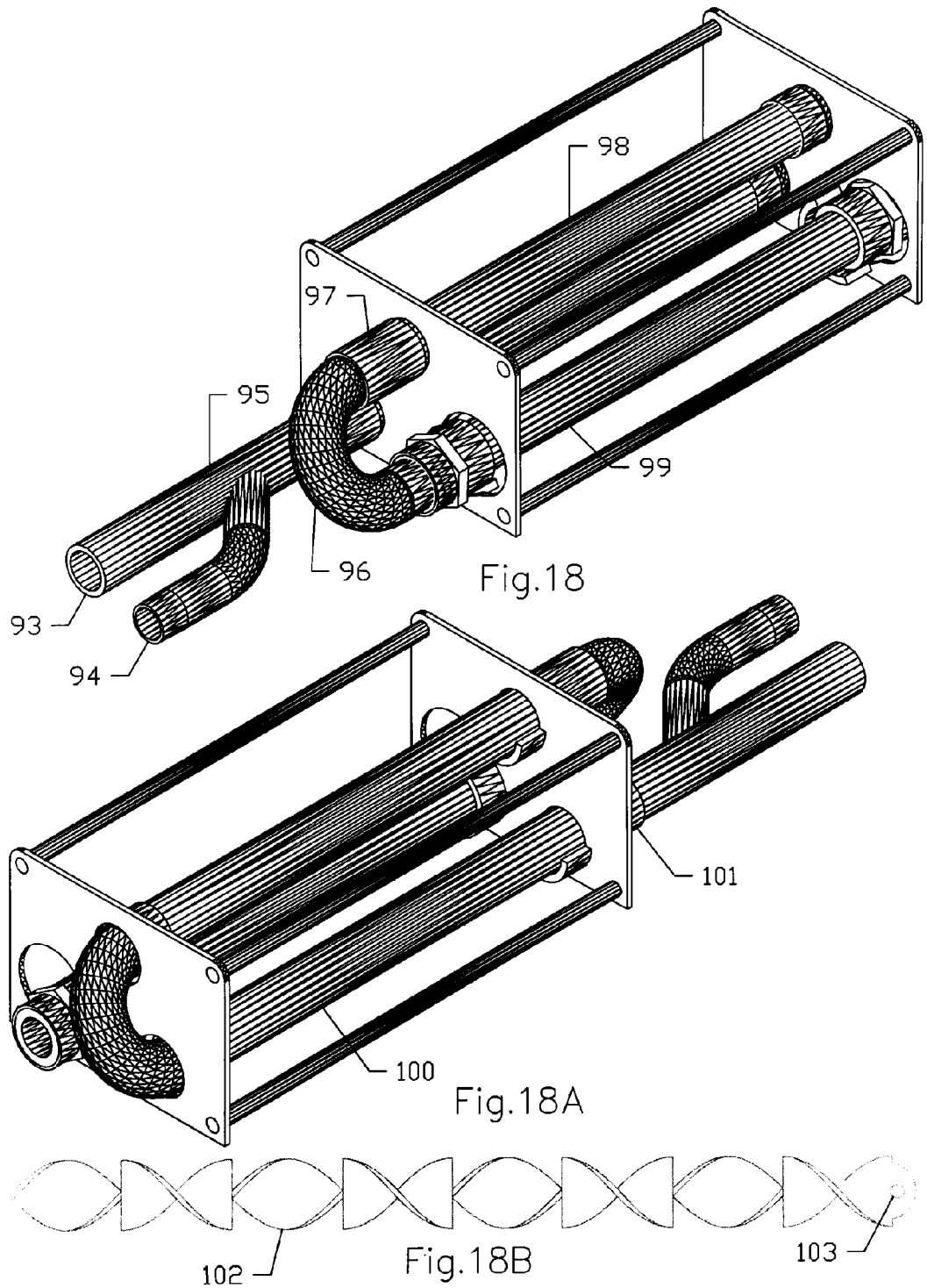

APPARATUS FOR PUMPING AND MIXING HIGH AGGREGATE PLURAL COMPONENTS OF DIFFERING VISCOSITIES

BACKGROUND a. Field of the Invention

The invention is in the field of fluid handling apparatus having a plurality of inputs of varying characteristics that converge at a common zone.

b. Description of the Related Art

Corrosion is a major cause of failure of pilings and other structural members in marine environments. Cathodic protection greatly reduces corrosion where pilings are constantly in contact with water, but is of little help in the areas where alternate exposure to air and water occurs due to tidal effects and to wave action. It has been found that encapsulating the piles with plastic formulations will greatly reduce corrosion in this area of piles. This encapsulation process is described in U.S. Pat. Nos. 4,876,896 and 4,993,876, which description is incorporated by reference herein. One type of plastic formulation which provides an exceptionally strong and abrasion-resistant coating for piles is an epoxy resin blended with silica sand. In application, a liquid resin-sand mixture and a liquid hardener-sand mixture are pumped through a static mixer and into a form surrounding a pile. The resulting polymer-sand mixture fills the void between the form and the pile and then hardens. This hardened polymer-sand mixture binds to both the form and the pile.

A critical piece of equipment in this encapsulation process is the pump used to inject the resin-sand mixture and the hardener-sand mixture into the static mixer and thence into the form. Since the weight ratio of sand-free hardener to sand-free resin is an important factor in achieving the desired physical properties of the polymer, it is essential that the volumetric flows of said hardener and said resin monomer be maintained to achieve the proper weight ratio of said hardener to said resin. Additionally, as both the hardener mixture and the resin mixture contain silica sand, the effective viscosity of each of the sand-free monomers is increased by the addition of such aggregate and must be taken into account in the pumping process. Minor changes in the volume ratio of hardener to resin monomer, such as that caused by small temperature changes which affect the densities of the mixtures, do not seriously affect the physical properties of the final polymer and are ordinarily ignored. While many formulations use a ratio of resin to hardener of 1:1, other ratios can be accommodated by adjusting the diameters of the piston pump cylinders.

In practice, plural component pumping systems employ piston pumps to pump the said mixtures into the static mixer and thence into the form, although diaphragm pumps or progressive cavity pumps could theoretically be employed. However, these other types of pump have not usually been employed because of problems with maintenance or with timely detection of the need for maintenance. In order to keep the ratio of the flows of said hardener and said resin constant, two pumps are used in practice, each being driven by its own drive mechanism controlled by a timing device or both being driven by a single driving mechanism. Since the viscosities of the hardener-sand mixture and the resin-sand mixture can vary considerably, both with temperature and with the concentration of sand in the mixtures, the back-pressures on the two pumps will ordinarily be different, resulting, in the case of a single drive mechanism, in unequal forces on the pistons of the two said pumps with resulting torque on the driving mechanism and on the aforesaid pumps. This torque tends to distort the pumps, leading to non-uniform wear on the pump pistons and cylinders.

The presence of sand in the aforesaid pump feeds produces a very abrasive medium, which causes severe wear on all parts of the pump with which the sand comes in contact. This wear results in pump leaks, which cause an unacceptable imbalance in the ratio of the feeds of hardener-sand mixture and resin-sand mixture, necessitating replacement of worn parts before operation can be continued. Typical throughput of pumps before such maintenance is required is 4.25-5.66 cubic meters (150-200 cubic feet) of material for pumps presently being used in this service. If it becomes necessary to shut down a pump for repairs during the filling of a form, it is necessary to return the pump to service quickly, as the polymer-sand mixture has a pot life of approximately one hour or less. Pumps currently in use require several hours to repair, and an interrupted injection of encapsulating feed will result in either beginning a second injection cycle, with the risk of an unacceptable "cold" joint between the two injections, or abandonment of the first injection, followed by removal of the partial injection, re-cleaning the pile, replacing the form, and injecting with the polymer-sand mixture once again.

The silica sand, having more than twice the density of either the said resin or the said hardener, tends to settle out and concentrate in the bottoms of the respective pump feed tanks and to settle in pumping lines at low flow rates. Even at normal flow rates some settling is found to occur in any region of the pipeline or other part of the pumping system where enlargements or non-uniform cavities exist. Such concentration in the feed tanks will alter the composition of the mix being fed to the molds and therefore can cause non-uniform physical properties in the coating on the piles being encapsulated. In order to avoid such non-uniformity, it has been found necessary to adequately stir the mixtures in the respective pump feed tanks. The mixing action in the feed tanks must be adequate to suspend the sand in the respective liquid media and also to avoid entraining air into the liquid. Air bubbles or foam entrained in the liquid will expand during the suction stroke of the piston pump and thereby prevent the complete filling of the pump cylinder, thus altering the volume of liquid discharge on the pressure stroke.

In the practical application of coatings to marine pilings the pumping unit is located as close to the pile as is convenient in order to minimize the length of line through which the mixtures must be transferred. Consequently, it is advantageous that the pumping unit be portable and compact. The resin and the hardener are normally supplied in 19 liter (5 gallon) cans and the sand is supplied in 23 kg (50 pound bags). All ingredients are normally fed manually into the feed tanks, and it is most convenient to avoid having to lift the materials onto a platform before feeding them into the respective feed tanks. Ergonomic considerations dictate that these feed materials not be lifted above chest height while charging them into the feed tanks, thereby limiting the height of the pumping unit. Existing pumping units do not meet all of these criteria.

Many of the moving parts of existing pumping units are exposed. Workers can come into contact with, and suffer injury from, components such as piston pumps, drive pumps, and mixing paddles. As mentioned above, injury can also result when workers have to repeatedly lift 19 liter (5 gallon) monomer cans and 23 kg (50 pound) bags of sand onto the elevated platforms of existing pumping units.

Maintenance of existing pumps requires a minimum of four hours to disconnect feed and discharge lines from the pump, to remove the pump from the unit and dismantle it, to replace worn parts, to reinstall the pump and to reconnect the piping. Such work done in the field normally requires additional time because of the lack of efficient repair facilities. With the aforementioned frequency of required repairs, much time is expended in maintenance, resulting in a significant loss of time in productive work.

The resin monomer normally used in this application is white in color, and the hardener monomer normally used in this application is black in color. A combination of the two components in the proper ratio results in a particular shade of gray. To ensure the proper mixing of the two components, it is necessary to monitor the color of the polymer-sand mixture during the pumping process. This is customarily accomplished by a diver observing the color and progression of the polymer-sand mixture through the translucent form as said mixture fills the void between the form and the structural member. This approach is problematic, however, since it is critical for the diver to know the composition of the polymer-sand mixture before it is pumped into the form. Further, in low-visibility conditions, it becomes difficult for the diver to see the exact shade of the polymer-sand mixture though the translucent form.

Oftentimes, the two monomers are not sufficiently blended, which results in poor adhesion to the form and/or the structural member that is intended to be protected. The current practice to increase the mixing characteristics of the static mixer is to utilize a second standard-sized static mixer in line with the first. This invariably results in significantly increased backpressure on the system. Standard static mixers are likewise prone to blockage by foreign material or unmixed aggregate due to their small diameter. Cleaning standard static mixers is accomplished by removing the mixing element from the housing, and as this is often done after the polymer-sand mixture has begun to cure, the process can be difficult.

What is needed, therefore, is an apparatus for pumping and mixing high aggregate plural components of differing viscosities that does not cause unequal forces between the pumps, is more resistant to wear, reduces settling of aggregate, is quick to repair, does not require lifting bags and buckets greater than chest height, is compact, has reduced backpressure, and permits the operator to verify proper mixture amounts and proper blending before the mixture is poured.

SUMMARY

The present invention is directed to satisfying the need for an apparatus for pumping and mixing high aggregate plural components of differing viscosities that does not cause unequal forces between the pumps, is more resistant to wear, reduces settling of aggregate, is quick to repair, does not require lifting bags and buckets greater than chest height, is compact, has reduced backpressure, and permits the operator to verify proper mixture amounts and proper blending before the mixture is injected into the form. The present invention comprises a portable pumping system that, with the exception of the clear static mixer and the necessary hoses, is mounted upon a framework. Such system includes two hoppers that can be filled by a person standing at the level of the frame base, making it much more ergonomic than pumping units currently used. Each hopper is equipped with a hydraulically driven auger operating in a horizontal orientation and at a rotational speed sufficient to suspend the silica sand additive without entraining air in either the resin or the hardener. These counter-angled helically shaped augers are attached to a square drive shaft and scrape the sides and bottoms of the hoppers, said action driving virtually all of the mixture from the hoppers so as to minimize any waste. Inadvertent contact between the operator and the auger blades is virtually eliminated by the use of a protective screen installed on top of the hoppers. A vertical divider prevents the premature mixing of a monomer and aggregate that would occlude the screen. The monomer-sand mixture within each hopper is kept within a specified thermal range by means of a jacket filled with hydraulic fluid. This jacket doubles as the hydraulic fluid reservoir. The hydraulic fluid is alternatively heated or cooled by means of an immersion heating element or a fan and heat exchanger, each of which is controlled by a thermocouple.

The augers feed the monomer-sand mixtures into each of two piston pumps. These pumps are mounted in a common block, connected with a yoke, and driven by a reciprocating hydraulic drive. The two piston pumps are mounted in the block in close proximity to each other to minimize side loading on the system. The pumps are constructed to be far more wear-resistant than conventional pumps, and are designed and assembled so that field repairs can be accomplished in a fraction of the pot life of the polymer-sand mixture. Repairs will consist primarily of replacing modules containing those parts most subject to wear.

The monomer sand mixtures are pumped through two separate hoses to a manifold, thence through the static mixer, and finally through a short hose into the form. Three sections of the static mixer are "looped" together so that they do not have to be connected end-to-end in one linear assembly. An end-to-end linear assembly would make the unit unwieldy on the deck of a barge where there is limited workspace. Each section lies parallel to the other two sections in one compact unit. The housing of the first two mixing elements is made of stainless steel, while the last housing section is made of clear polyvinyl chloride (PVC). The clear housing permits visual inspection of the polymer-sand mixture before injection into the form, and there exists a diver-operated valve on the hose near the injection port that can be closed if the mixture is not acceptable, preventing the unacceptable mixture from ever being injected into the form in the first place. The diameter of the housing is larger than what is currently in use, which alleviates much of the backpressure created by both the additional mixing elements and the tight turn radii of the housing assembly. The mixing elements are removable from the housings to allow for ease of cleaning, which must be done after each day of pumping. Removal is made easier by the addition of a removal loop welded to the end of each mixing element.

Moving parts are enclosed by protective covers, panels, shrouds, or screens.

The portable pumping system is powered by an external 460-volt power source that is connected to the system by an appropriate gauge conductor cable. The system also consists of the framework assembly, an electric motor, a hydraulic pump, a reciprocating hydraulic drive piston, a potentiometer control panel, a valve block, hydraulic drive motors for the augers, an electrical control unit, an air cooling unit (the radiator and fan), a water cooling unit (a heat exchanger), various sensors (e.g.—fluid level sensor, temperature sensors, pressure sensors, voltage sensor, etc.), and all necessary valves, piping, hoses, flanges, and connectors.

The features of this portable pumping system can most easily be understood by referring to the accompanying drawings, description, and claims.

DRAWINGS

Figure 17:
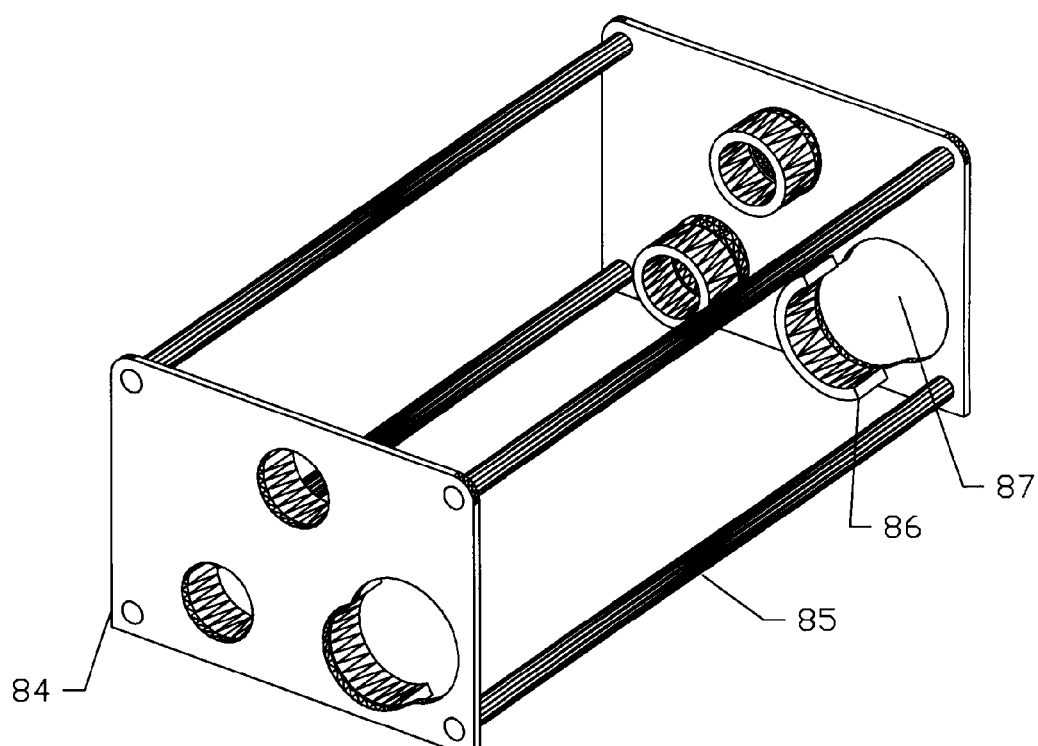
FIG. 17 is an isometric view of the static mixer frame.
Figure 17A:
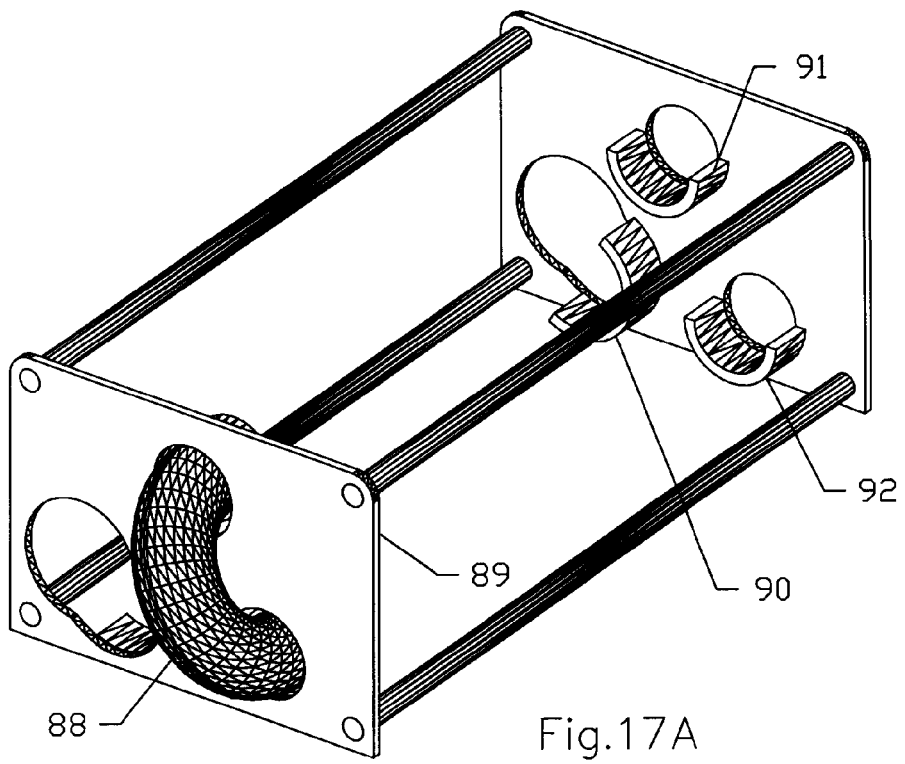

FIG. 17a an an isometric view of the static mixer frame of FIG. 17 from a different perspective.

FIG. 18 is an isometric view of the static mixer with the static mixer frame of FIGS. 17 and 17a.

FIG. 18a is another view of the static mixer and static mixer frame of FIG. 18.

FIG. 18b is a plan view of the mixing element.

DESCRIPTION

The present invention is an apparatus for pumping and mixing high aggregate plural components of differing viscosities. It is particularly well suited for, but not limited to, pumping two-part epoxy with sand mixed as the aggregate. The apparatus comprises a system having at least two hoppers for receiving the components and aggregate, augers within the hoppers, piston pumps for each component, hydraulic fluid reservoir with heating and cooling jacket, and a clear static mixer. Other features that may be beneficial include a framework assembly, electric motor, hydraulic pump powered by the electric motor, reciprocating hydraulic drive piston, potentiometer control panel, valve block, hydraulic drive motors for the augers, electrical control unit, air cooling unit in the form of a radiator and fan, water cooling unit heat exchanger, fluid level sensor, temperature sensor, pressure sensor, voltage sensor, and connecting valves, piping, hoses, flanges, and connectors.

Refer to the accompanying drawings wherein the reference numbers designate corresponding parts and features throughout the several views. Although the preferred embodiment is an apparatus for pumping a two part epoxy and has sand as the aggregate, it can be appreciated that this invention covers apparatuses handling more than two fluids.

Figure 1:
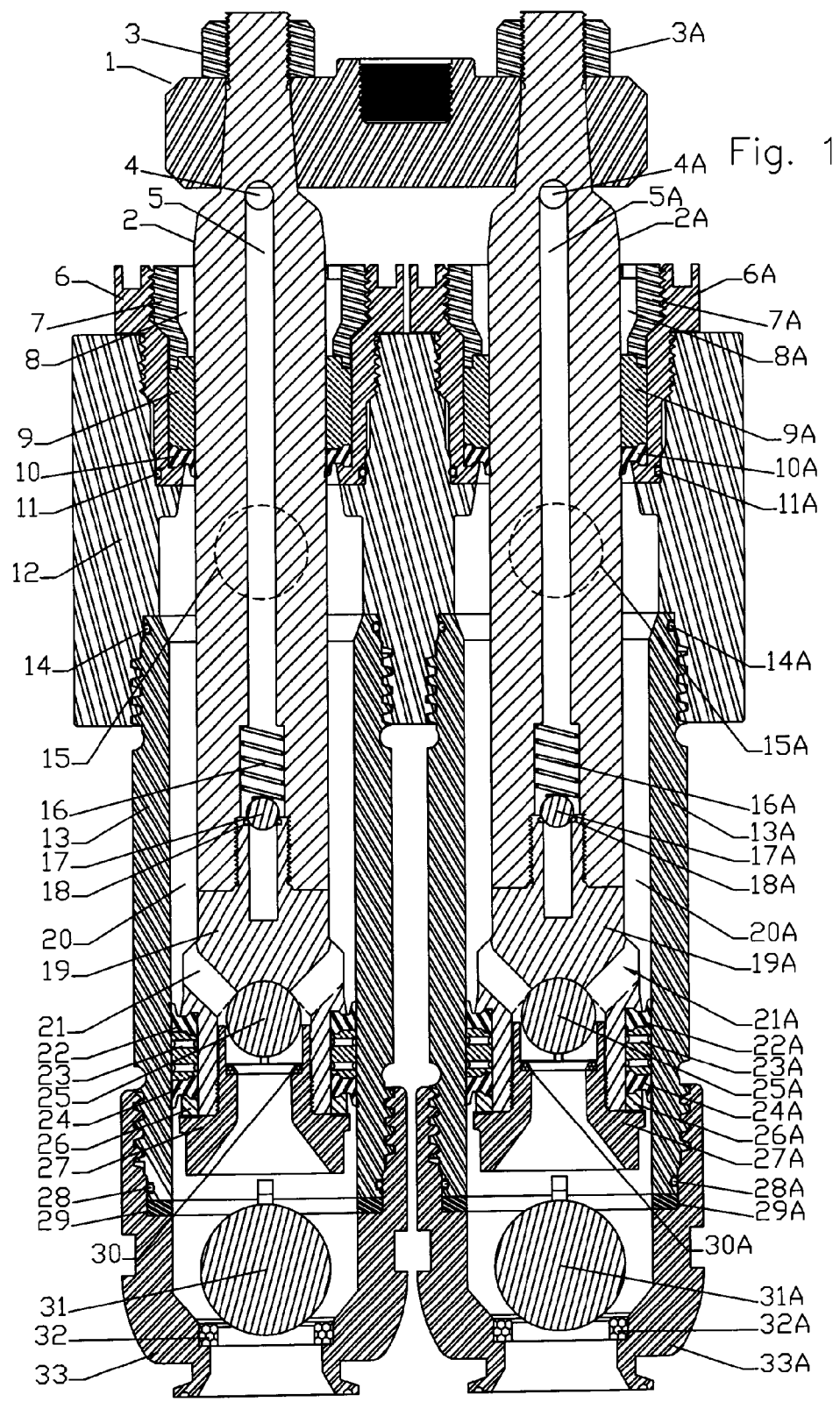
FIG. 1 is a cross sectional view of the two piston pumps showing details of construction of the piston, the packing seals, and other internal components.
Figure 2:
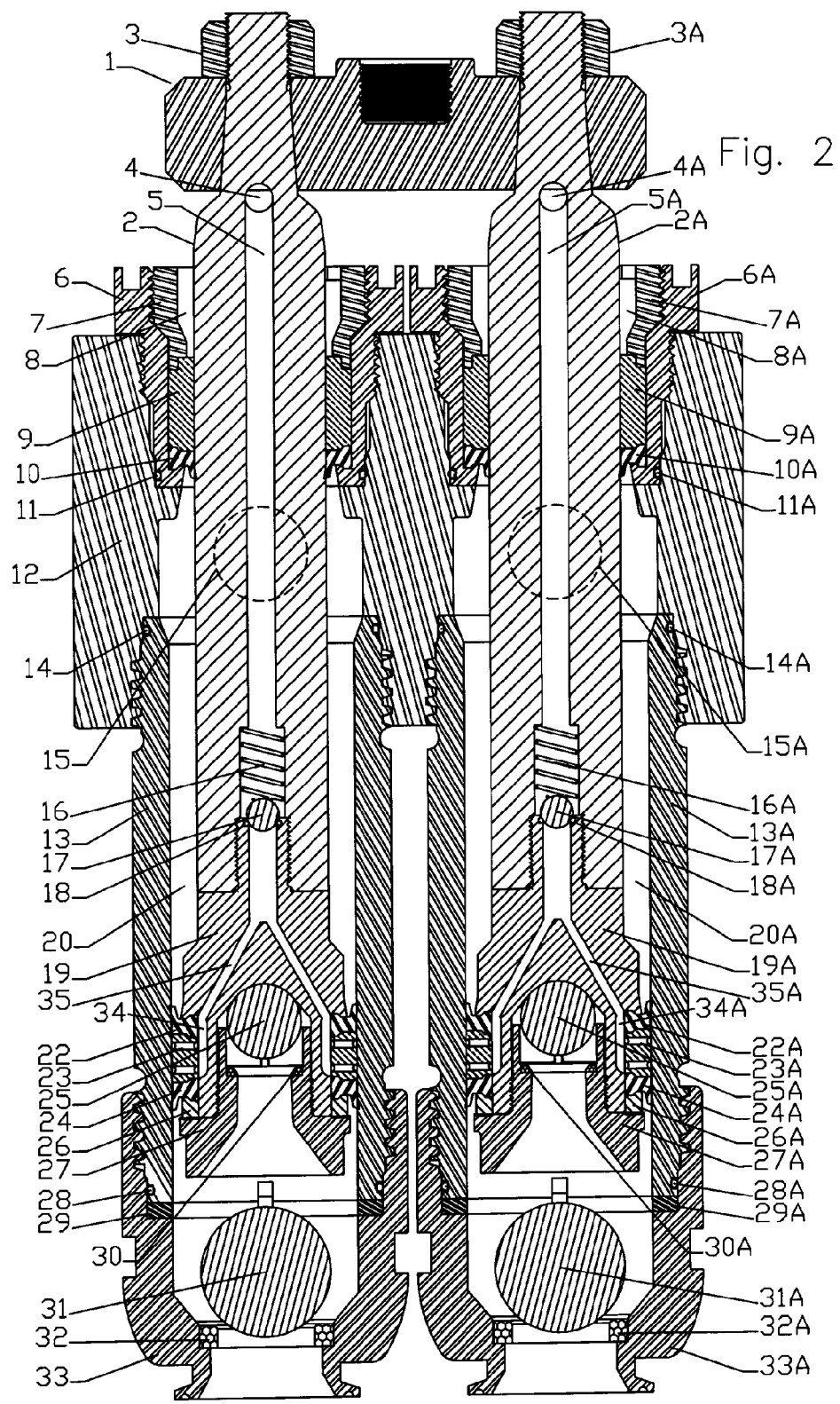
FIG. 2 is a cross sectional view of the two piston pumps where only the lower piston has been rotated 45 degrees to show the lower piston relief grooves on the outer surface of the lower piston and the lower piston relief ducts.

FIGS. 1 and 2 are cross sectional views of the two connected piston pumps and related components. A coupling yoke 1 connects the two upper pistons 2, 2A. The coupling yoke 1 is generally bar shaped and has parallel recesses adapted to receive and removably secure the upper pistons 2, 2A. In the preferred embodiment, the recesses are through holes having a counter sink for receiving the frustro-conical ends of the upper pistons 2, 2A. The two upper pistons 2, 2A are secured to the coupling yoke 1 by means of threaded nuts 3, 3A. The preferred embodiment also has a threaded hole between the recesses adapted to be secured to a hydraulic arm for moving the yoke 1 and pistons.

Upper pistons 2, 2A both have hollowed centers to permit relief of pressure and passage of bypass discharge. Drift holes 4, 4A are provided in the upper pistons 2, 2A to permit the use of a drift pin to aid in disassembly, permit relief of pressure and passage of bypass discharge, and provide an inspection point to assess the wear of the lower packing assembly.

Upper piston relief ducts 5, 5A are provided in the passageway in the upper piston through which pressure is relieved and bypass discharge passes. Upper packing housings 6, 6A surround each upper piston 2, 2A and are connected to the coupling block 12 with threaded connections. The upper packing housings 6, 6A permit removal of the upper packing assembly in one unit. The upper packing assembly comprises the upper packing housings 6, 6A, the upper packing nuts 7, 7A, the upper bronze bearings 9, 9A, the upper packing seals 10, 10A, and the upper packing housing O-rings 11, 11A. Along with the upper packing nuts 7, 7A, the upper packing housings 6, 6A lock the upper bronze bearings 9, 9A and the upper packing seals 10, 10A in place.

Upper packing assembly relief cavities 8, 8A that are formed between the upper pistons 2, 2A and the upper packing nuts 7, 7A permit relief of pressure and passage of bypass discharge, and provide an inspection point to assess the wear of the upper packing seals 10, 10A.

Upper bronze bearings 9, 9A are preferably made of self-lubricating sintered bronze bearing material to reduce wear on the upper pistons 2, 2A and are grooved to allow the relief of pressure and the passage of bypass discharge. They are shown in more detail in FIG. 3 and FIG. 3a.

Upper packing seals 10, 10A are preferably made of ultra-high molecular weight polyethylene, or other synthetic polymer. The leading edge of the seals 10, 10A is angled and shaped to maintain proper contact with the upper pistons 2, 2A. The outside of the seals 10, 10A is shaped such that it locks into place between the upper packing housing 6, 6A and the upper bronze bearings 9, 9A.

Upper packing housing O-rings 11, 11A are provided to form a positive seal between the coupling block 12 and the upper packing housings 6, 6A. The coupling block 12 forms a stable housing for the two pumps, locks both in place to minimize lateral movement and the associated wear of components during operation, and aligns the two pumps within 5 mm (³⁄₁₆ inch) of each other to minimize unequal forces on the two pistons due to the differing viscosities of the resin and the hardener, for example.

Cylinders 13, 13A are provided and are threadably connected to the coupling block 12 to permit ease of disassembly. The threads are preferably centralizing Acme threads to assist in proper centering of the cylinder. The cylinders' chamfered inner top edge allows placement and compression of the lower packing seals 22, 22A, 24, 24A during reassembly. The material exit ports 15, 15A are holes through the coupling block 12 that allow passage of the pumped material from the cylinder annular material cavities 20, 20A into the feed hoses.

Top cylinder O-rings 14, 14A are provided to form a positive seal between the coupling block 12 and the cylinders 13, 13A.

Check valve springs 16, 16A are disposed within the upper pistons 2, 2A, and center check valve balls 17, 17A and hold them in place. The "check valves" are comprised of the check valve springs 16, 16A, the check valve balls 17, 17A, and the check valve O-rings 18, 18A. The check valves prevent the entry of air into the monomer-aggregate mixture during the upstroke of the pistons while allowing the release of excess pressure and material from the lower packing assemblies.

Lower pistons 19, 19A are provided and are threadably connected to the upper pistons 2, 2A. The "lower packing assemblies" consist of the lower pistons 19, 19A, piston bases 27, 27A, piston base check balls 25, 25A, piston base check ball seats 30, 30A, piston base washers 26, 26A, lower packing seals 22, 22A, 24, 24A, and lower bronze bearings 23, 23A. The lower packing assembly is removable and may be replaced as an entire modular unit. This simplifies and expedites field repairs, which minimizes down time.

The cylinder annular material cavities 20, 20A are where the monomer-aggregate mixture, for example, is pumped from through the material exit ports 15, 15A during both the upstroke and down stroke of the pistons. The lower piston material passageways 21, 21A are where the monomer-aggregate mixture, for example, is pumped through into the cylinder annular material cavities 20, 20A during the down stroke of the pistons.

The top lower packing seals 22, 22A are preferably made of ultra-high molecular weight polyethylene or other synthetic polymer. The leading edge is angled and shaped to maintain proper contact with the cylinders 13, 13A. The outside of the seals 22, 22A are shaped such that they lock into place between the lower pistons 19, 19A and the lower bronze bearings 23, 23A.

The lower bronze bearings 23, 23A are preferably made of self-lubricating sintered bronze to reduce wear on the cylinders 13, 13A. The bronze bearings 23, 23A are grooved to allow the relief of pressure and the passage of bypass discharge.

The bottom lower packing seals 24, 24A are preferably made of ultra-high molecular weight polyethylene or other synthetic polymer. The leading edge is angled and shaped to maintain proper contact with the cylinders 13, 13A. The outside of the seals 24, 24A are shaped such that they lock into place between the piston base washers 26, 26A and the lower bronze bearings 23, 23A.

Piston base check balls 25, 25A are provided to permit passage of the monomer-aggregate mixture, for example, only during the down stroke of the pistons. The piston base washers 26, 26A are shaped to lock into the bottom lower packing seals 24, 24A. Piston bases 27, 27A are threadably connected to lower pistons 19, 19A. The piston bases 27, 27A lock the piston base washers 26, 26A, the lower packing seals 22, 22A, 24, 24A, and the lower bronze bearings 23, 23A into place.

Bottom cylinder O-rings 28, 28A form a positive seal between the inlet bases 33, 33A and the cylinders 13, 13A. Ball cage inlet washers 29, 29A keep the inlet check balls 31, 31A aligned and in close proximity to the inlet check ball seats 32, 32A so that, when the piston reverses direction, a seal is made immediately. The piston base check ball seats 30, 30A are preferably constructed of tungsten nickel carbide to greatly minimize wear, and are also removable and replaceable.

The inlet check balls 31, 31A permit passage of the monomer-aggregate mixture, for example, only during the upstroke of the pistons. The Inlet check ball seats 32, 32A are preferably constructed of tungsten nickel carbide to greatly minimize wear, and are also removable and replaceable. Inlet bases 33, 33A are threadably connected to the cylinders 13, 13A. The inlet bases 33, 33A are machined to accept a sanitary fitting, and removal allows access to the lower packing assemblies.

FIG. 2 is a cross sectional view of the two piston pumps of FIG. 1 where the lower pistons 19, 19A have been rotated 45 degrees to show the lower piston relief grooves 34, 34A on the outer surface of the lower pistons 19, 19A and the lower piston relief ducts 35, 35A.

Figure 3:
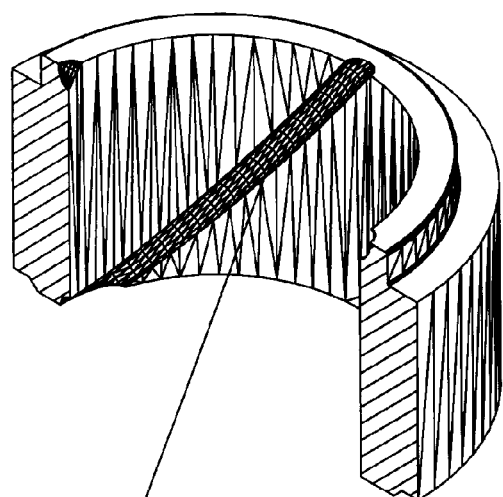
FIG. 3 is a cross sectional isometric view of the upper bronze bearing.
Figure 3A:
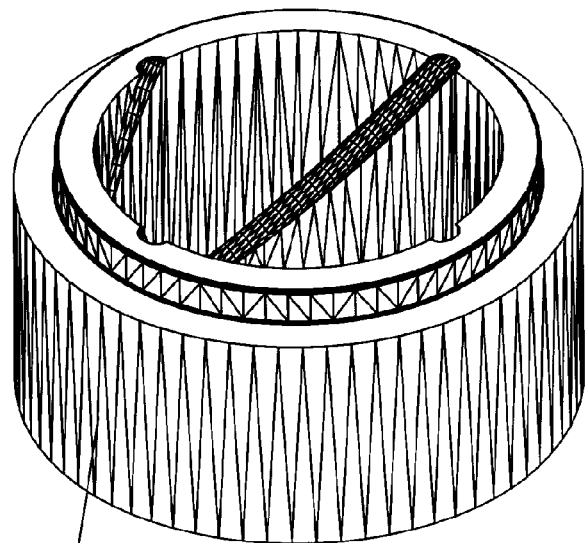
FIG. 3a is an isometric view of the upper bronze bearing.

FIGS. 3 and 3a show a cross sectional isometric view and full isometric view respectively of the upper bronze bearings 9, 9A. The upper bronze bearings 9, 9A are preferably made of self-lubricating sintered bronze to reduce wear on the upper pistons 2, 2A. They include internal grooves 9.1, 9A.1 to allow the relief of pressure and the passage of bypass discharge.

Figure 4:
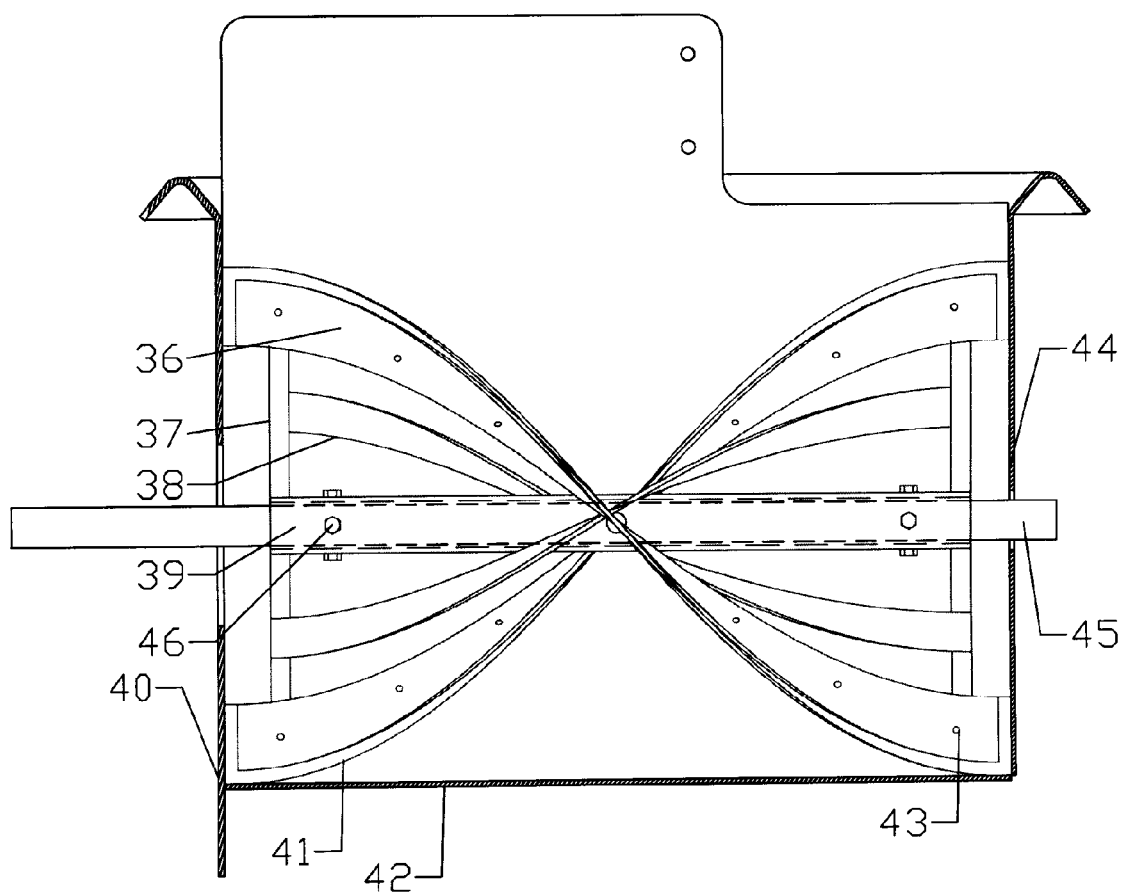
FIG. 4 is a cross sectional view of the port hopper, with the vertical cutting plane dividing the hopper midway through the driveshaft. The flights of the auger remain in full view and appear as seen from the side, and are not divided by the vertical cutting plane that divides the hopper.

FIG. 4 is a cross sectional view of the port hopper, with the vertical cutting plane dividing the hopper midway through the driveshaft. The flights of the auger remain in full view and appear as seen from the side, and are not divided by the vertical cutting plane that divides the hopper. At least one outer flight 36 is provided, but inner flights 38 may also be provided. There are preferably six auger flight armatures 37 on each auger shaft 39, positioned in three pairs. Each pair consists of two armatures 37 positioned on opposite sides of the auger shaft 39. Each armature 37 is preferably welded to the auger shaft 39 at a 90 degree angle. The outer two pairs of auger flight armatures 37 are aligned in the same plane, while the middle pair is aligned at a 90 degree angle from both the auger shaft 39 and at a 90 degree angle from the other armatures. The auger shaft 39 is preferably made of square tube material. The inner flights 38 may be secured in the opposite directional sense as the outer flights 36 to establish a shear zone during rotation that more completely mixes the fluids.

The hopper front plate 40 is preferably constructed of 6.4 mm (0.25 inch) thick stainless steel that forms the front of both hoppers. An outer flight scraper 41 is preferably attached to the outer flights 36 and is adapted to scrape the inside of the hoppers in operation. The outer flight scraper is preferably made of a double thickness of 4.8 mm (3/16 inch) thick fiber-reinforced rubber. Other associated items shown in FIG. 4 are the hopper bottom 42, outer flight scraper mounting holes 43 used to bolt the outer flight scrapers 41 to the outer flights 36, hopper back wall 44, drive shaft 45, and auger shaft positioning bolts 46 used for securing and centering the auger shaft 39 on the drive shaft 45.

Figure 5:
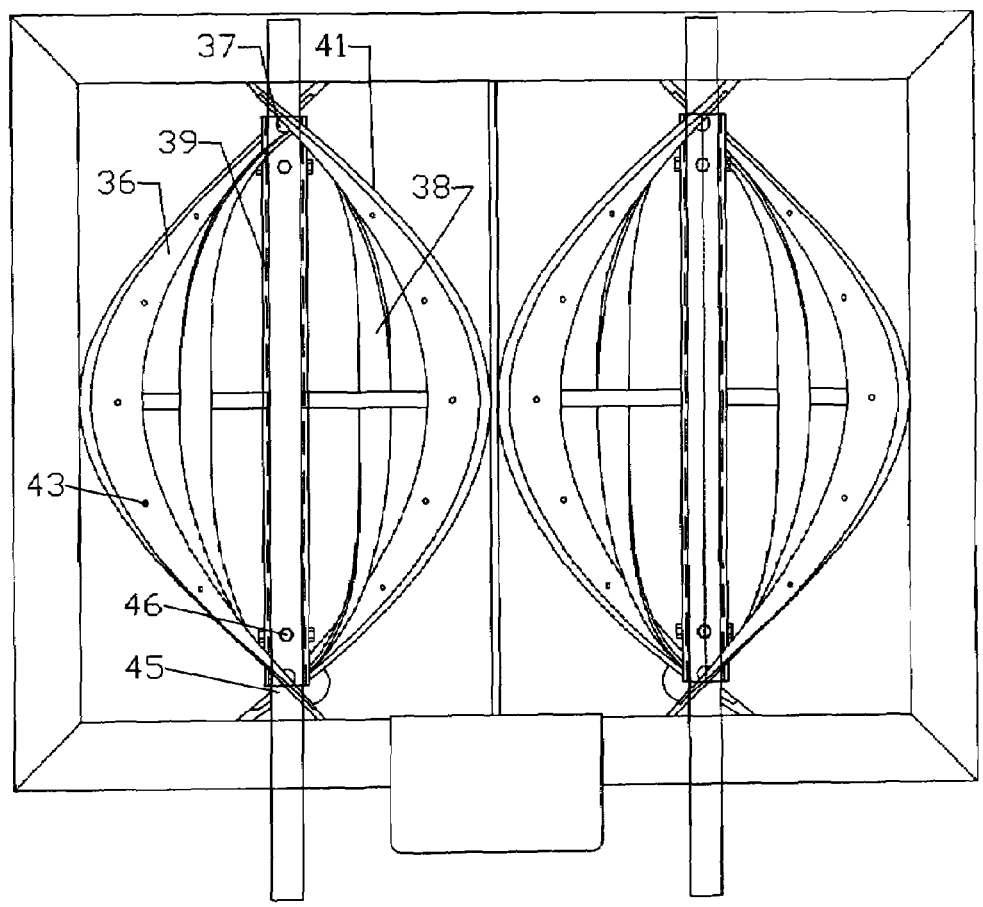
FIG. 5 is a top view of the hopper assembly with the protective screens removed to allow an unobstructed view of the auger assemblies.

FIG. 5 is a top view of the hopper assembly with the protective screens removed to allow an unobstructed view of the auger assemblies.

Figure 6:
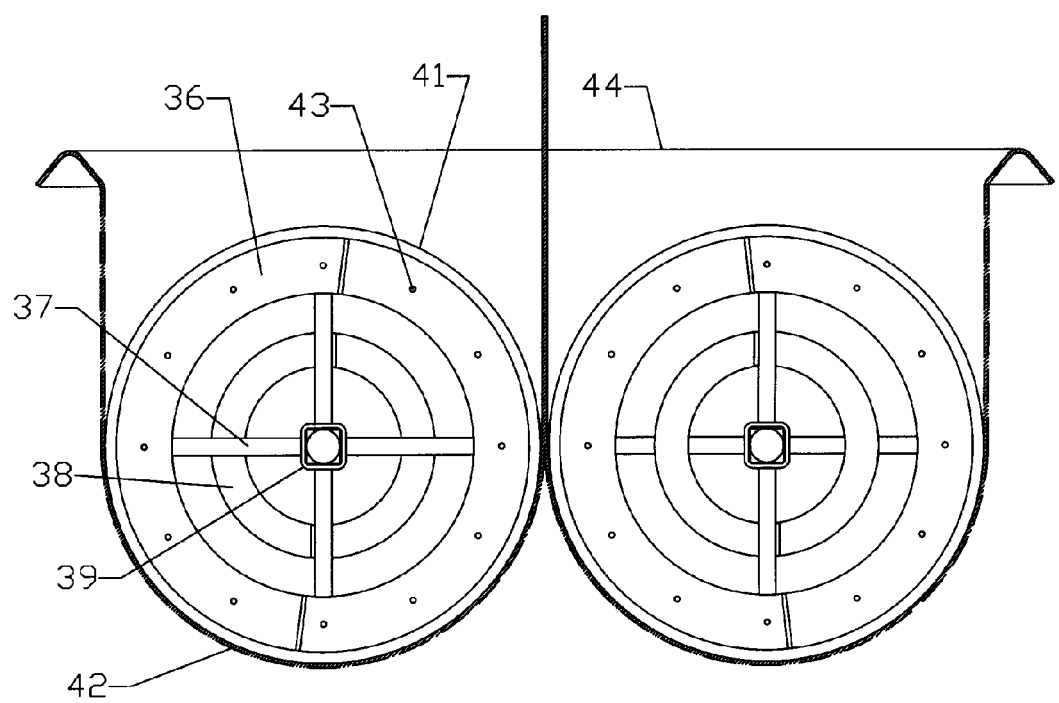
FIG. 6 is a cross sectional front view of the hopper assembly, with the full auger assemblies in view.

FIG. 6 is a cross sectional front view of the hopper assembly, with the full auger assemblies in view.

Figure 7:
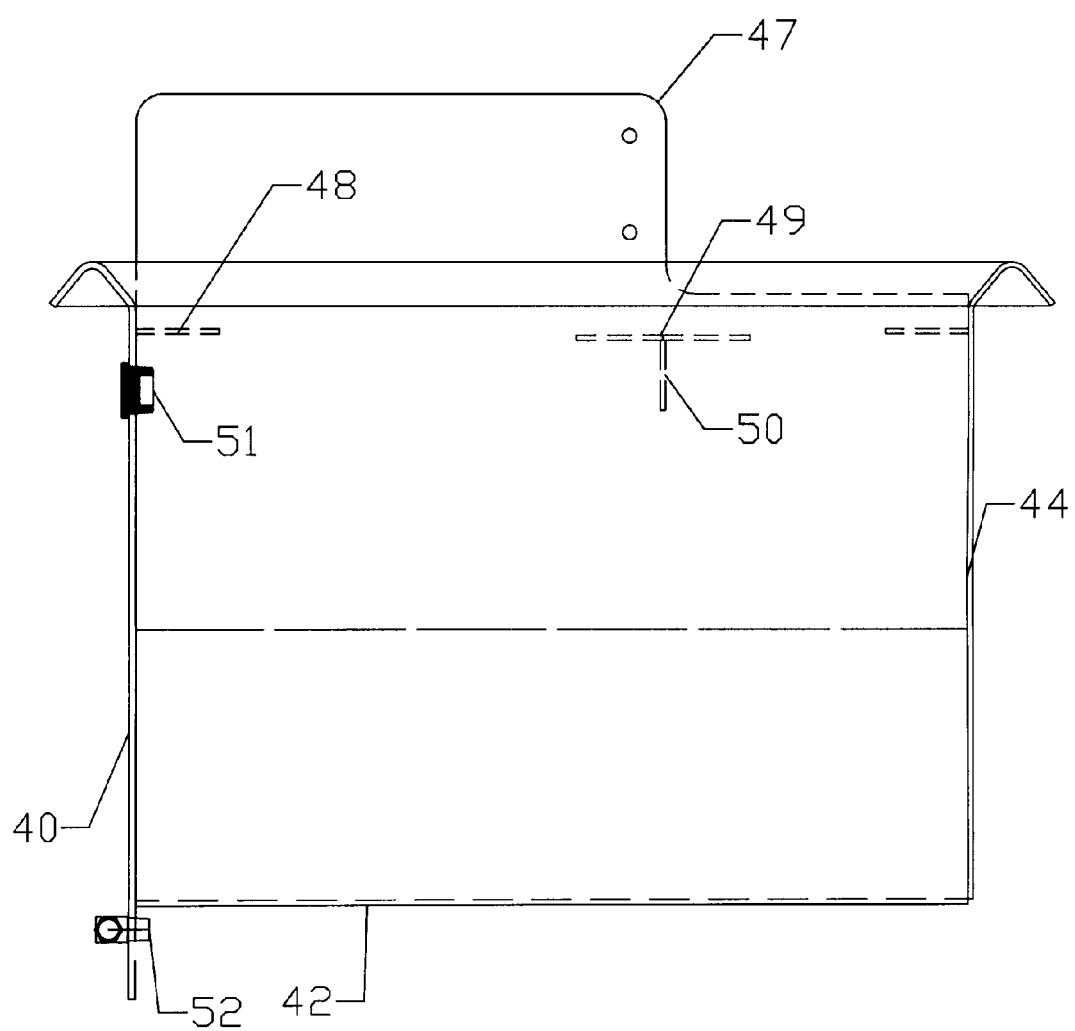
FIG. 7 is a port side full view with hidden hopper lines shown.

FIG. 7 is a port side full view with hidden hopper lines shown. A main hopper divider 47 is welded to the two hoppers and serves to divide the hopper for a fluid of a first viscosity from the hopper for a fluid of a different viscosity. A protective screen support 48 provides a lip on which to rest the protective screen. The apparatus is suitable for handling a solid aggregate mixed with the fluids. Therefore, a liquid-solid divider base 49 is provided to which the liquid-solid dividers are mounted.

Other associated structures include a liquid-solid divider base support 50 and a material return port 51, which is used to connect a material hose back to the hopper if it becomes necessary to temporarily disconnect the static mixer. Also provided is a hydraulic auger drive motor case drain fitting 52. Excess hydraulic fluid supplied to the hydraulic auger drive motor returns to the hydraulic fluid reservoir via a hose that connects to this fitting.

Figure 8:
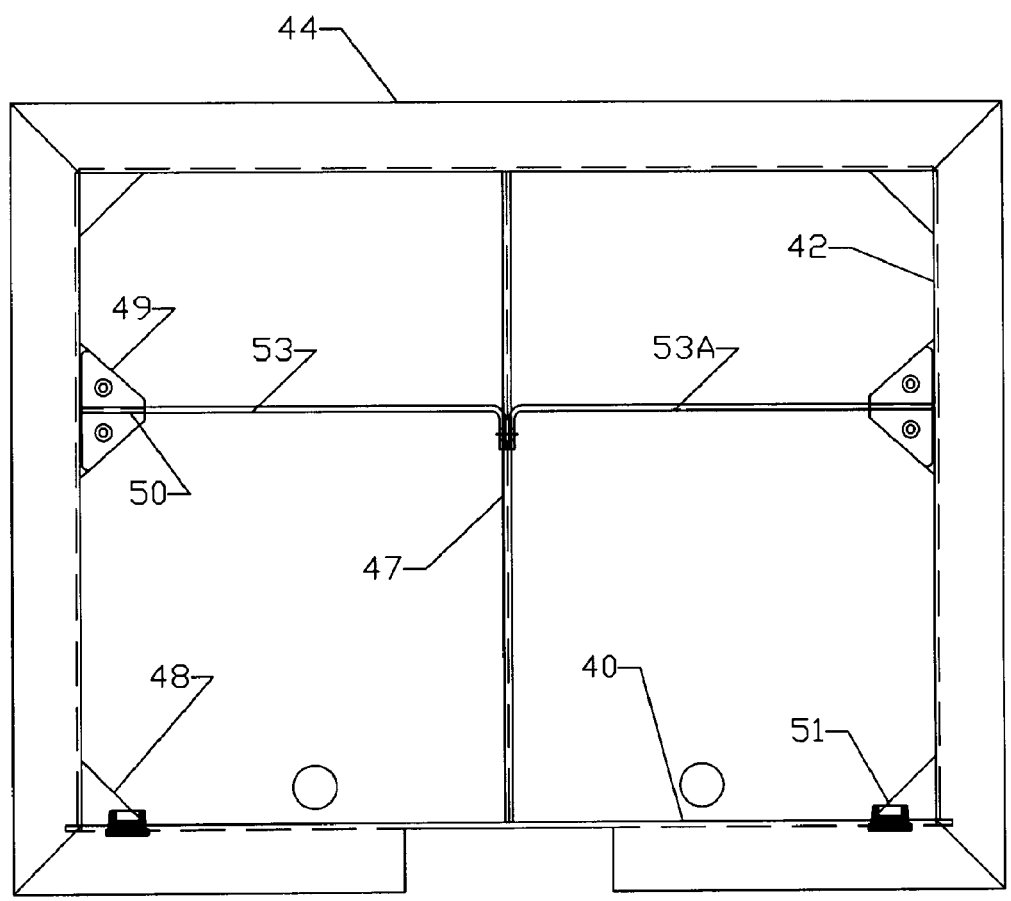
FIG. 8 is a top view of the hopper assembly, to further detail the components shown in FIG. 7.

FIG. 8 is a top view of the hopper assembly, to further detail the components shown in FIG. 7. Liquid-solid dividers 53, 53A are bolted to the main hopper divider 47 and to the liquid-solid divider bases 49.

Figure 9:
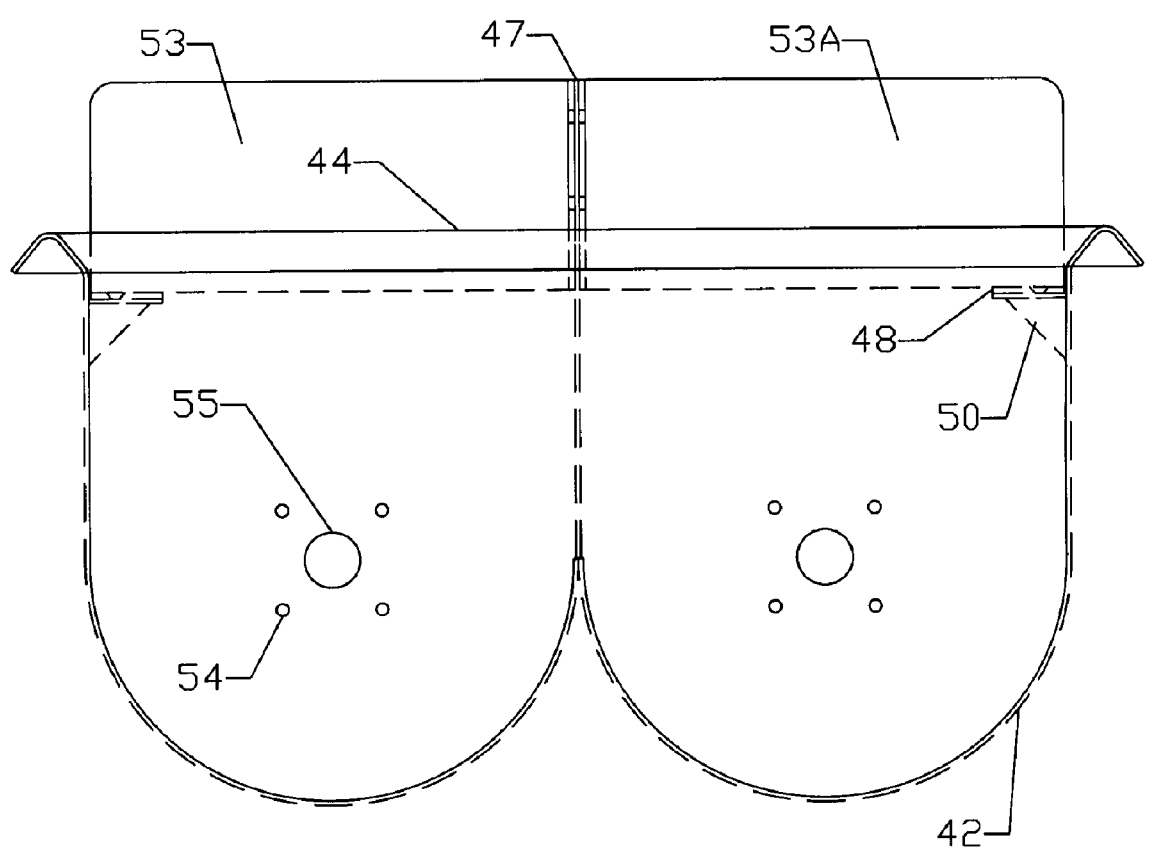
FIG. 9 is a rear view of the hopper assembly.

FIG. 9 is a rear view of the hopper assembly. Associated structures include liquid-solid dividers 53, 53A that are bolted to the main hopper divider 47 and to the liquid-solid divider bases 49, auger driveshaft bearing mounting holes 54 where the auger driveshaft bearings are bolted in place, and driveshaft removal hole 55 that allows for removal of the driveshaft from the rear of the pumping unit.

Figure 10:
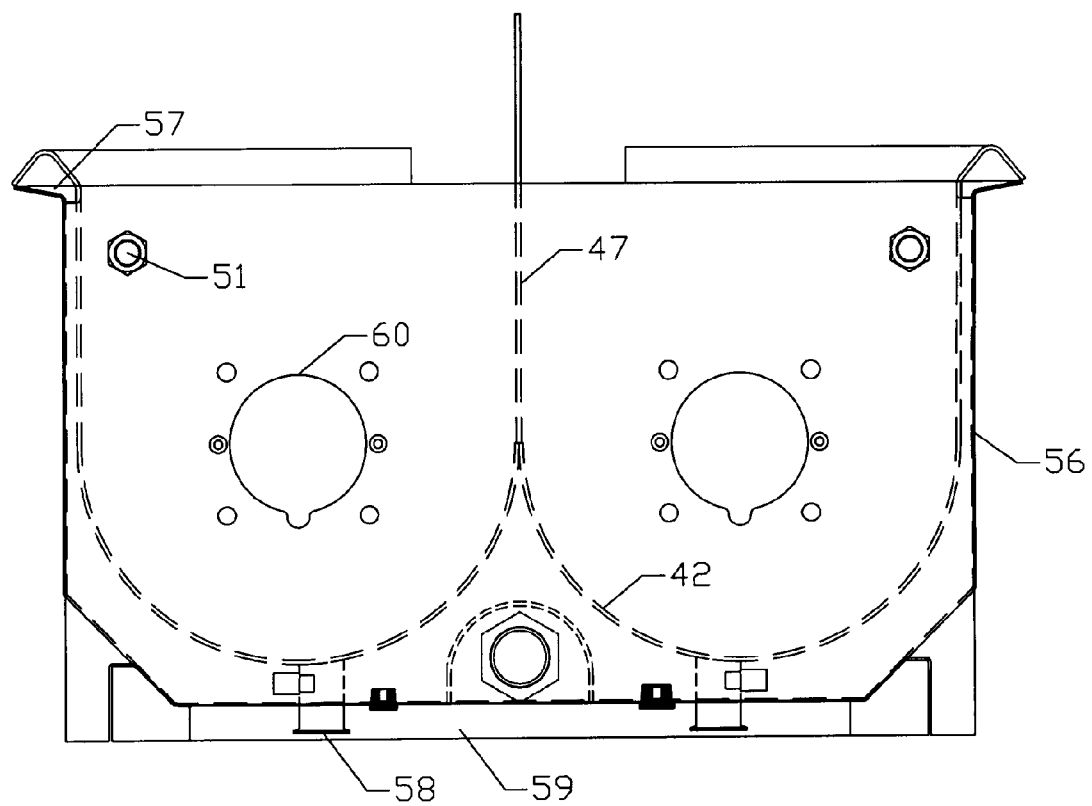
FIG. 10 is a front view of the hopper assembly.

FIG. 10 is a front view of the hopper assembly. Associated structures shown in this view include a main jacket 56 that forms the exterior of the heating and cooling jacket/hydraulic fluid reservoir, a jacket lip filler plate 57 that seals the ends where the main jacket 56 and the hoppers meet, and a material exit port 58 from which the monomer-aggregate mixture passes though. Additional structure shown in this view include a seam guard 59 that is preferably made of stainless steel and welded to the bottom of the jacket 56, fits in front of the frame front plate 64 shown on FIG. 11 and extends over the top edge of said frame front plate 64. This prevents the intrusion of any debris or other foreign material through the gap between the jacket 56 and the frame front plate 64. Also shown is a hydraulic auger drive motor centering hole 60. The hydraulic auger drive motor fits into these holes and is bolted to the hopper front plate 40.

Figure 11:
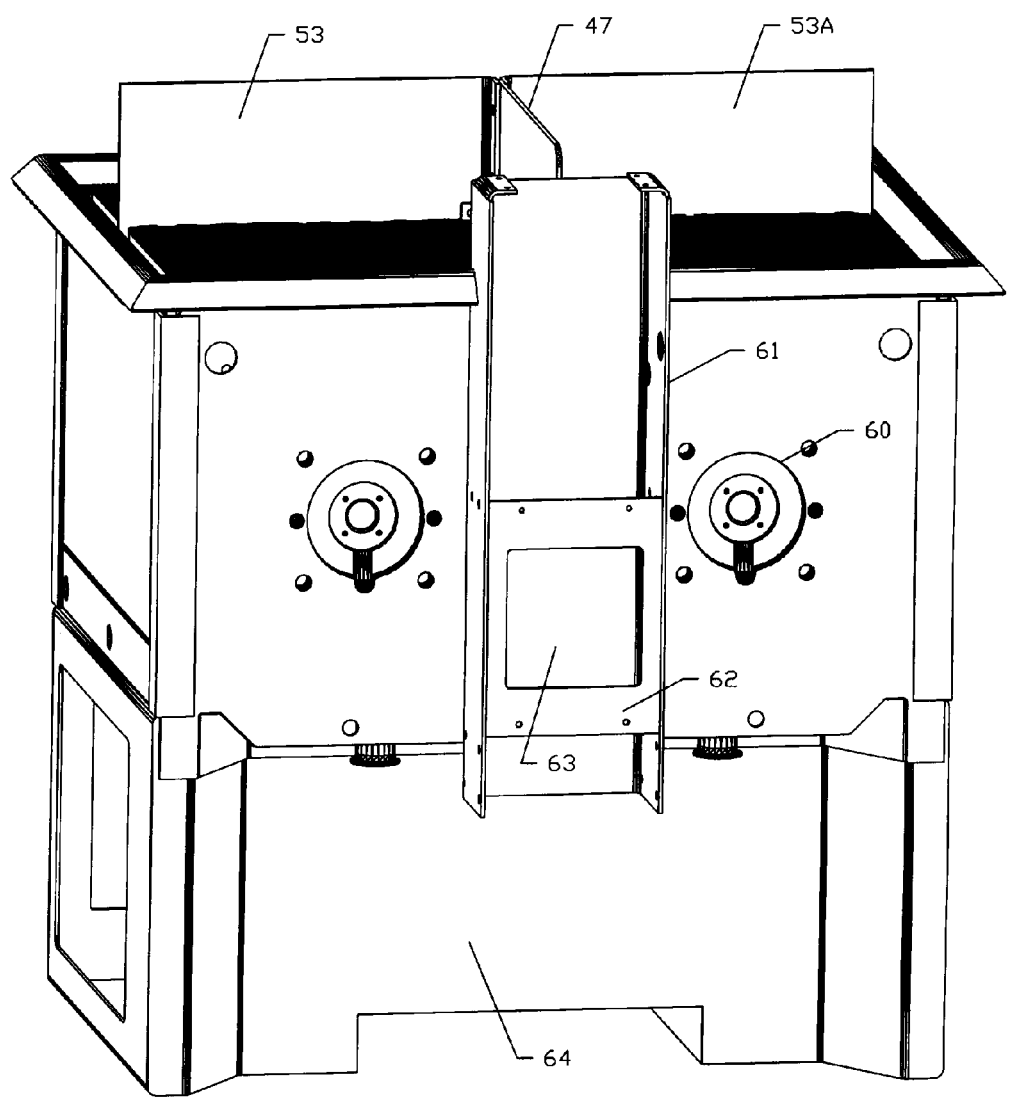
FIG. 11 is a front starboard isometric view of the hopper/jacket assembly and the framework assembly.

FIG. 11 is a front starboard isometric view of the hopper/jacket assembly and the framework assembly. Associated structure shown in this view include a plural piston pump assembly mounting channel 61, to which the coupling block 12 is bolted to at its base, such that the upper pistons 2, 2A and the reciprocating hydraulic drive are within the channel itself. The structure also includes a view port frame 62 in which is mounted a view port 63. The view port 63 is preferably a PLEXIGLAS transparent window allowing visual inspection of the plural piston pump assembly during operation. Also included is a frame front plate 64, which is a structural member of the frame and acts as a protective shroud for the electric motor and the hydraulic pump that are mounted behind the frame front plate and below the hopper/jacket assembly.

Figure 12:
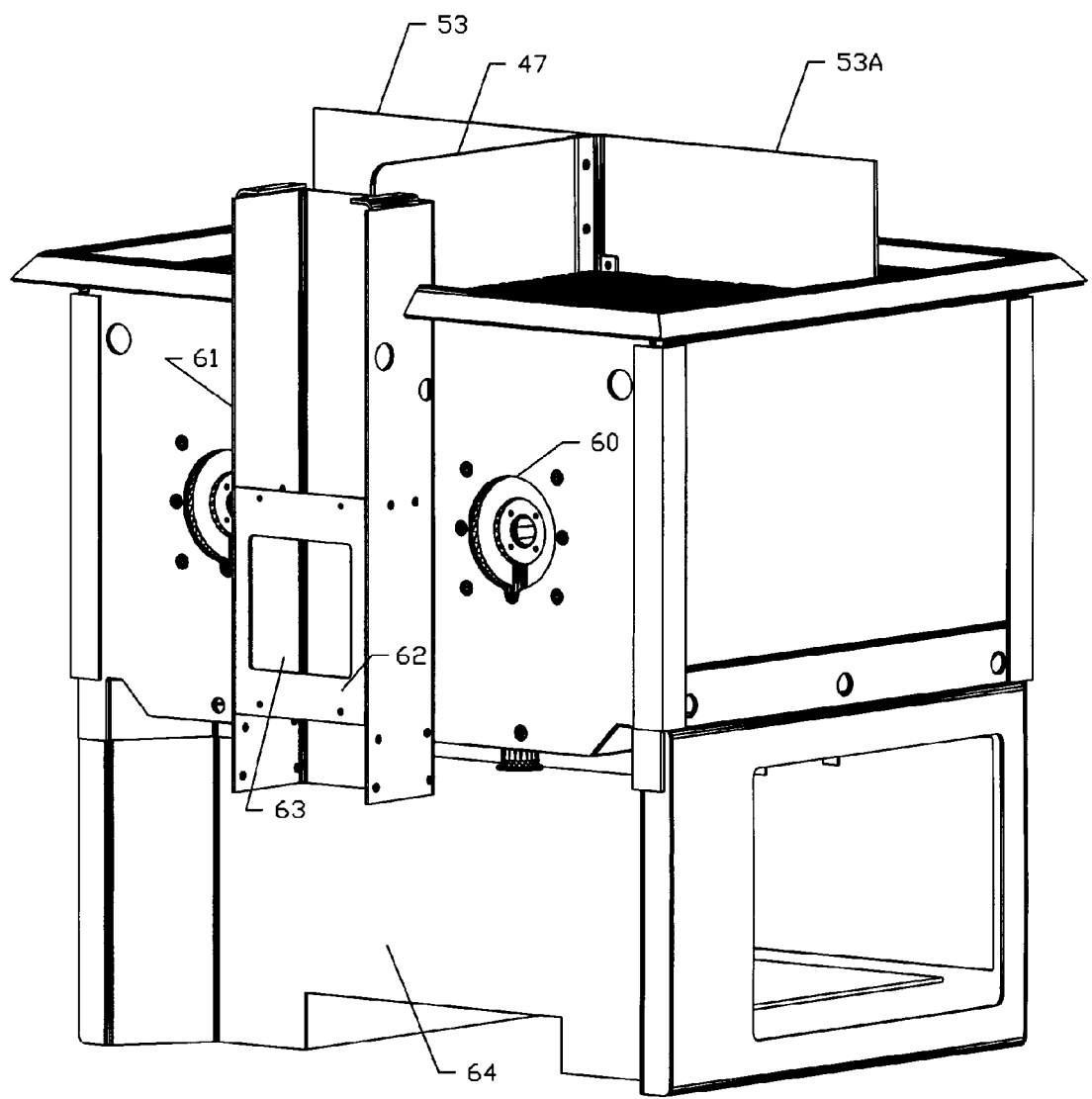
FIG. 12 is a front port isometric view of the hopper/jacket assembly and the framework assembly.

FIG. 12 is a front port isometric view of the hopper/jacket assembly and the framework assembly.

Figure 13:
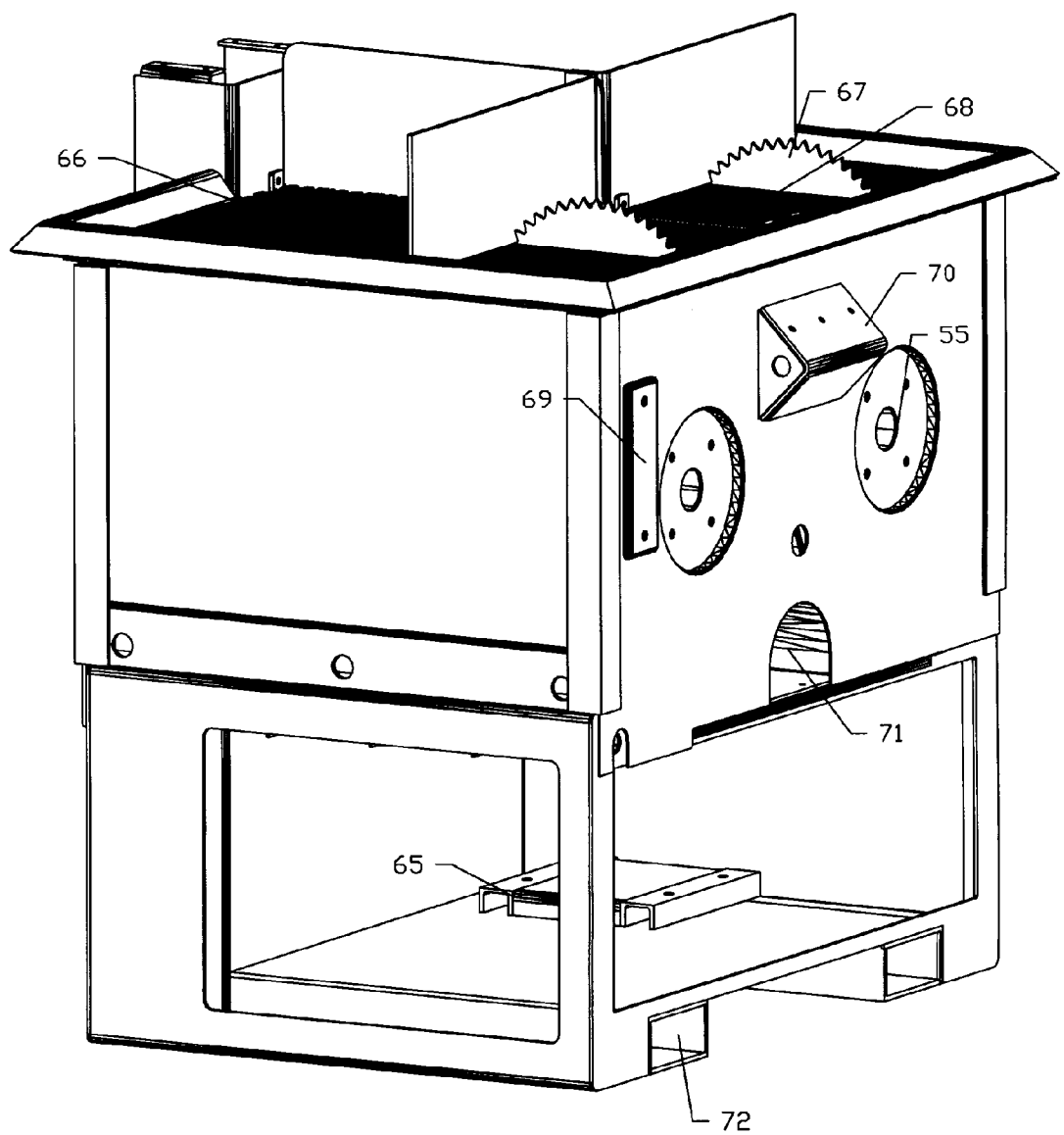
FIG. 13 is a rear port isometric view of the hopper/jacket assembly and the framework assembly.

FIG. 13 is a rear port isometric view of the hopper/jacket assembly and the framework assembly showing an electric motor mount 65, a liquid protective screen 66, a bag breaking device 67 being a serrated device that will cut open bags of sand that are dropped on it, a solid protective screen 68, a fluid level gauge mounting plate 69 that serves as the mount for the hydraulic fluid level gauge, a control box 70 that serves as the panel for the pump assembly controls, an immersion heater recess 71 in the back panel of the jacket assembly where the immersion heater will be inserted into the hydraulic fluid reservoir, and fork tubes 72. The fork tubes 72 are preferably aluminum tubes welded to the bottom of the frame that acts as both a structural member and as a lifting point for a forklift.

Figure 14:
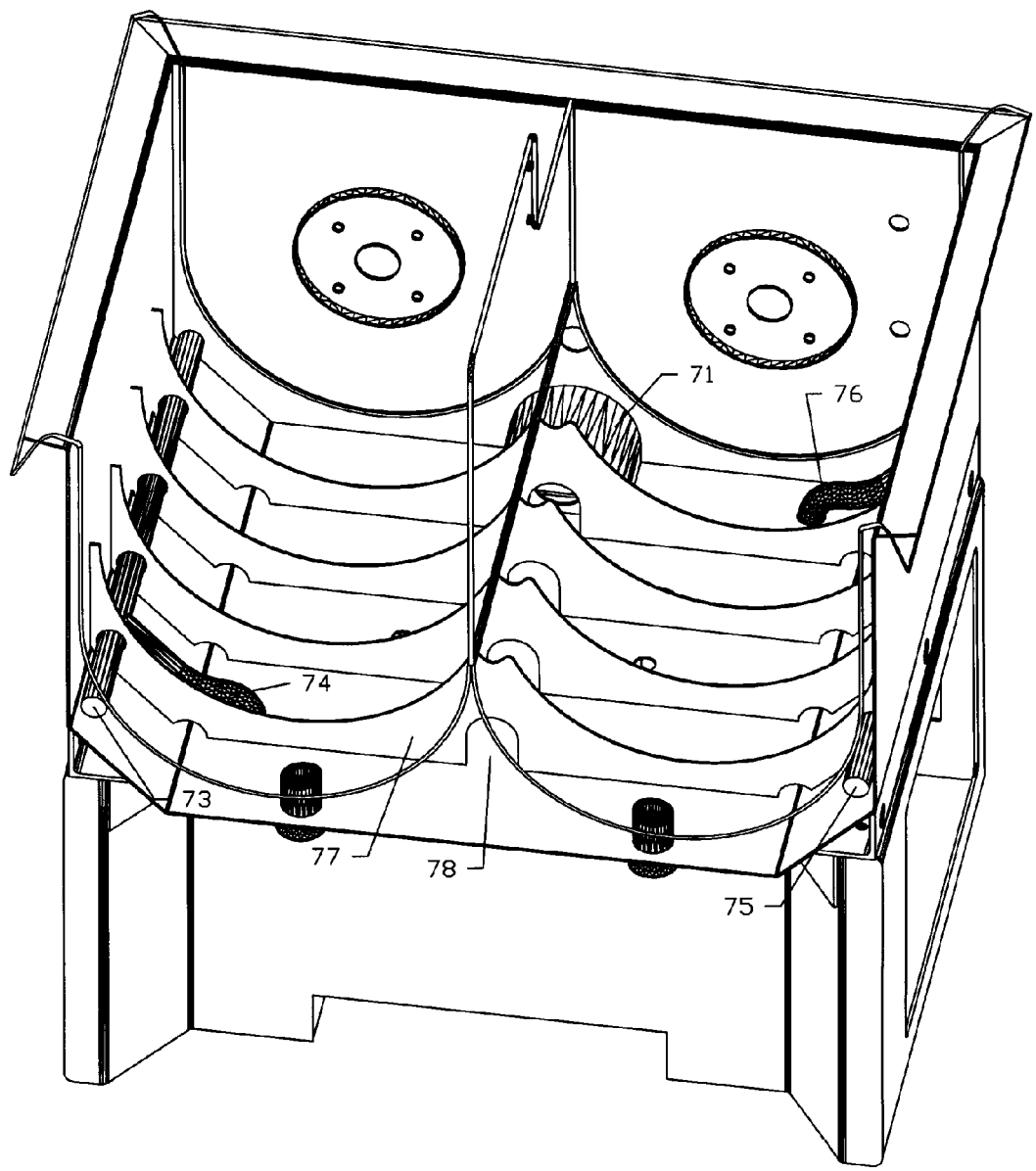
FIG. 14 is a front port partial isometric view of the jacket/reservoir assembly.

FIG. 14 is a front port partial isometric view of the jacket/reservoir assembly. The associated structure in this view includes a suction diffuser 73, which is a stainless steel pipe has one lengthwise row of drilled holes so that hydraulic fluid is drawn in throughout its entire length. Other structures include a suction side diffuser-to-outlet port connecting pipe 74, a return diffuser 75, the return diffuser preferably being a stainless steel pipe that has one lengthwise row of drilled holes so that hydraulic fluid is returned to the reservoir throughout its entire length, a return side diffuser-to-outlet port connecting pipe 76, a hydraulic fluid reservoir baffle 77, and an immersion heater cutout 78.

Figure 15:
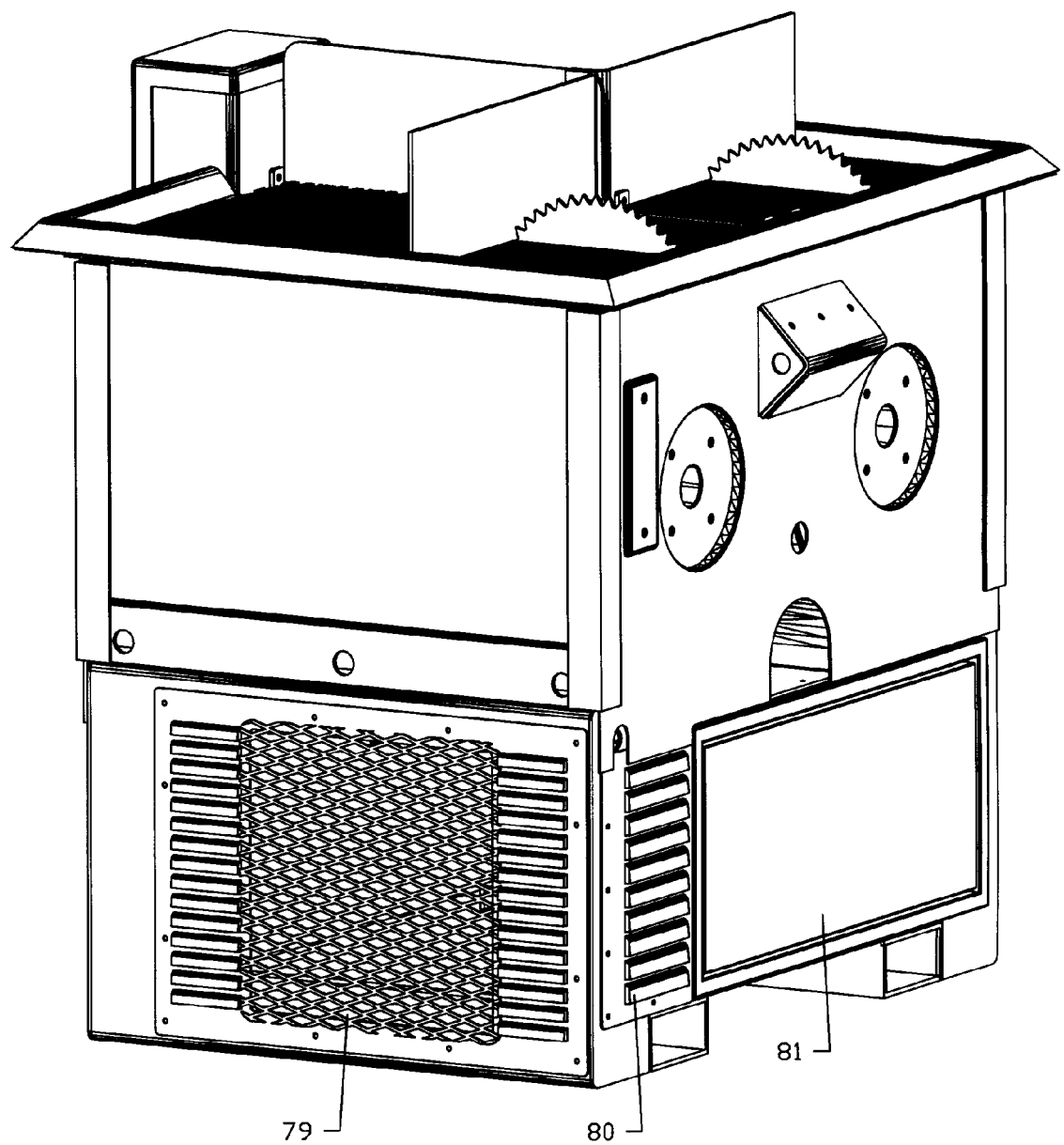
FIG. 15 is a rear port isometric view showing the protective shrouds and electrical box in place.

FIG. 15 is a rear port isometric view showing the protective shrouds and electrical box in place. They are, in particular, the port side safety shroud 79, rear safety shroud 80, and electrical box 81.

Figure 16:
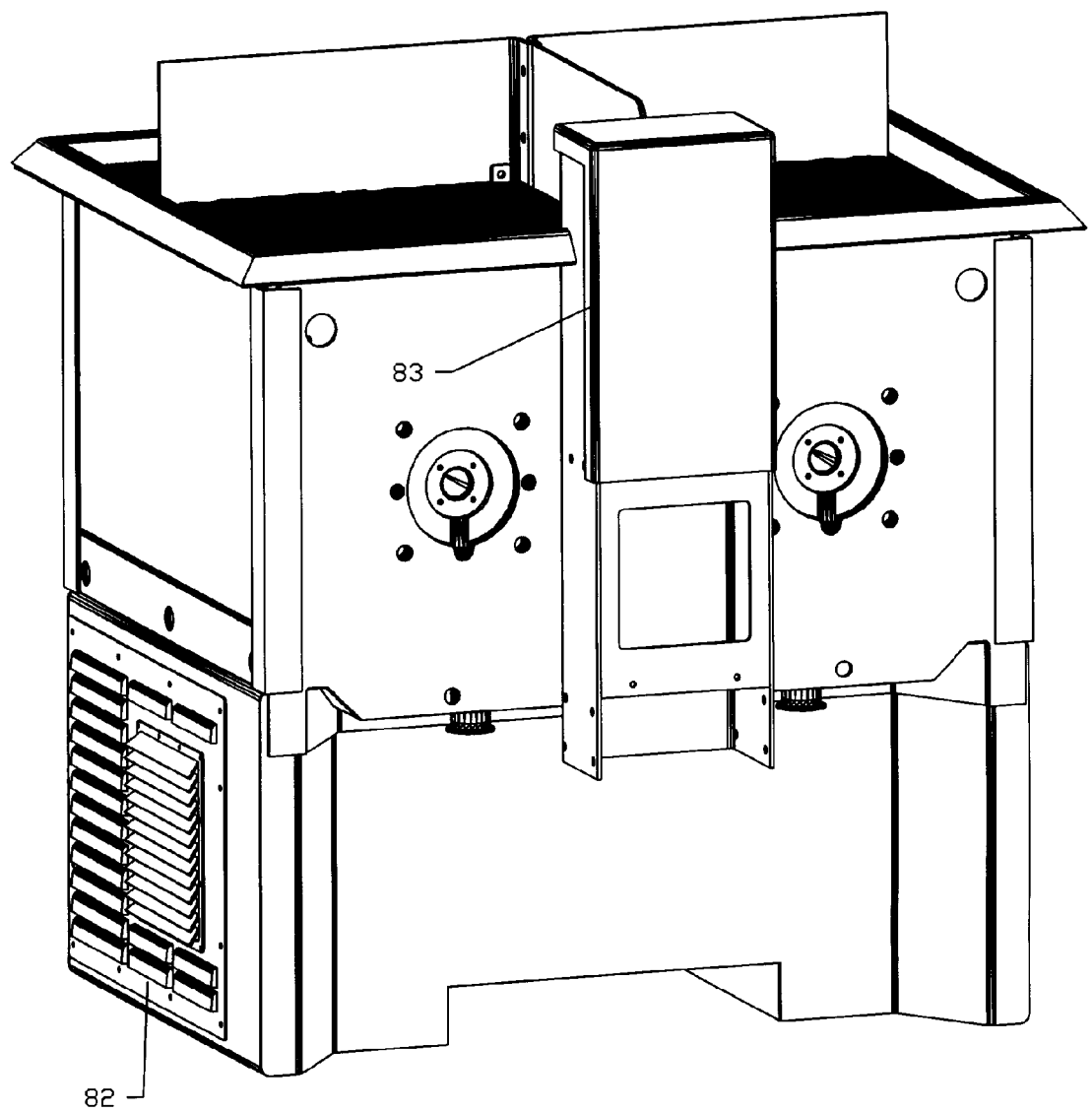
FIG. 16 is a front starboard isometric view showing the protective shrouds and covers in place.

FIG. 16 is a front starboard isometric view showing the protective shrouds and covers in place. They are, in particular, the starboard side safety shroud 82, and mounting channel safety cover 83.

FIGS. 17 and 17a are two isometric views of the static mixer without the mixing element housings shown. The static mixer comprises a static mixer framework endplate, pump side 84 and static mixer framework end plate, form side 89. The entire framework consists of two parallel stainless steel plates joined by four round stainless steel rods 85. Third mixing element housing tabs 86, 90 are provided which are semicircular tabs perpendicularly welded to the base of each static mixer framework notch. These tabs allow for the use of a hose clamp to secure the third mixing element housing within the static mixer framework notches. Also provided are first and second mixing element housing tabs 92, 91, only one tab for each of these two mixing element housings. Again, these semicircular tabs are perpendicularly welded to the static mixer framework endplate, pump side. These tabs allow for the use of a hose clamp to secure one end of both the first and second mixing element housings. Additional structure shown in these figures include a static mixer framework notch 87 located on each static mixer framework endplate, which permits the partial rotation of the pump side 180 degree elbow, which in turn permits the third mixing element housing to be unscrewed from the pump side 180 degree elbow.

Also shown is the form side 180 degree elbow 88. This connects both the first mixing element housing and the second mixing element housing. Both connections are preferably threadable connections. It is preferably constructed of stainless steel, and is welded to the form side static mixer framework endplate.

FIGS. 18 and 18a includes two isometric views of the static mixer with the mixing element housings shown. FIG. 18b shows one view of a typical helical mixing element 102. Turning to FIGS. 18 and 18a, a hardener port 93 is provided. The hardener-aggregate mixture, which has a greater effective viscosity than the resin-aggregate mixture, is pumped through this port and then straight to the static mixer. Also provided is a resin port 94. The resin-aggregate mixture, which has less of an effective viscosity than the hardener-aggregate mixture, is pumped through this port and then into the static mixer. A mixing manifold 95 is provided in the shape as shown. A basic "Y" configuration is not used for this application. Instead, the higher-viscosity hardener mixture is pumped straight to the static mixer in a larger-diameter pipe, whereas the lower viscosity material must pass through a smaller-diameter pipe and make two additional turns. This assists in equalizing the volumetric flow of the two monomer-aggregate mixtures.

Also provided is a pump side 180 degree elbow 96, which joins the pump side 180 degree elbow connector 97 to the third mixing element housing 99. It is threadably connected to both the pump side 180 degree elbow connector and the third mixing element housing, permitting disassembly for cleaning. Once the third mixing element housing is disconnected from the pump side 180 degree elbow, and the mixing manifold is disconnected from the mixing manifold connector 101, the pump side 180 degree elbow can be unscrewed from the pump side 180 degree elbow connector.

A pump side 180 degree elbow connector 97 is also provided. This is a forged steel pipe connector that threadably connects the pump side 180 degree elbow to the second mixing element housing. Also provided is a second mixing element housing 98. Constructed of stainless steel, it is threadably connected on one end to the pump side 180 degree elbow connector and on the other end to the form side 180 degree elbow. This contains the second mixing element. Also provided is a third mixing element housing 99. This housing is threadably connected to the pump side 180 degree elbow, and contains the third mixing element. This housing is preferably constructed from clear polyvinyl chloride (PVC), permitting constant inspection of the polymer-aggregate mixture, but it can be made of any substantially clear material. The mixing element housings should preferably be sized as nominal 1.25 inch diameter schedule 80 pipe. This is larger than what is used in the prior art, and services to reduce pressure loss in the system.

A first mixing element housing 100 is constructed of stainless steel, and is threadably connected on one end to the mixing manifold connector and on the other end to the form side 180 degree elbow. This contains the first mixing element.

A mixing manifold connector 101 threadably connects the mixing manifold to the static mixer, and is made of forged steel. Disconnecting the mixing manifold from the static mixer permits access to and removal of the first mixing element from the first mixing element housing.

FIG. 18*b* shows a mixing element blade 102. There are three mixing elements, and each has multiple helically-shaped blades. Each blade is twisted 180 degrees about its longitudinal axis, and is welded to the adjacent blade. All blades are constructed of stainless steel, and the diameter of each mixing element is slightly smaller than the inside diameter of each mixing element housing. A removal hole 103 provided on the end of each mixing element is provided on a semicircular tab with a circular hole. This holed tab allows for the insertion of a hook to aid in the removal of each mixing element from its housing.

Not shown, but important to note, there are three stopper washers are placed inside the housing assembly at the downstream end of the mixing elements and secured in place. These prevent the mixing elements from being inserted too far into the housing assembly. Essentially, the mixing elements are inserted into their respective housings until they bottom out on these stopper washers.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An apparatus for pumping and mixing plural components of differing viscosities comprising:
   at least two hoppers, each hopper comprising a hopper outlet;
   a plurality of spaced dividers positioned vertically over the hoppers defining areas for adding each component to the hoppers, and one area for adding aggregate to each hopper;
   an auger rotatably secured within each hopper, the auger being adapted to wipe the inside surface of its respective hopper during rotation;
   a piston pump in communication with each hopper outlet, each piston pump comprising a pump inlet and a pump outlet, and each piston pump adapted to be joined by a coupling yoke, whereby components of differing viscosities can be pumped at a desired mix ratio and
   a static mixer comprising:
   a mixer inlet; and
   a mixer outlet, whereby plural components of differing viscosities can be uniformly pumped and mixed and observed.

2. The apparatus of claim 1, the augers comprising:
   a drive shaft;
   a plurality of helically-shaped outer flights adapted to move the component in the hopper toward the direction of the hopper outlet;
   a plurality of helically-shaped inner flights; and
   a plurality of armatures securing the outer flights and inner flights to the drive shaft.

3. The apparatus of claim 2, the outer flights comprising a flexible wiper portion secured to the outer flights, the wiper portion being adapted to wipe the inside surface of the hopper during rotation, whereby the component and aggregate is more completely mixed and the hopper may be completely clean after operation of the apparatus.

4. The apparatus of claim 2, the helically-shaped inner flights being secured in an opposite directional sense from the helically-shaped outer flights, whereby, when the auger is rotated, a shear zone is created that improves mixing.

5. The apparatus of claim 1, the piston pumps being positioned in a spaced, parallel relationship, and each pump comprising a cylinder and a piston adapted to slide within the cylinder, such that the distance between the centerline of the pistons is less than twice the diameter of the largest portion of each cylinder, thereby making the load on each pump substantially equal and reducing the wear on pump components.

6. The apparatus of claim 5, wherein each piston is adapted to be secured to the coupling yoke by a tapered fit adapted to reduce play between the pistons and the yoke.

7. The apparatus of claim 6, further comprising a lower packing assembly positioned at an end of the each respective piston opposite the piston end adapted to be secured to the coupling yoke, the lower packing assembly comprising:
   a lower piston;
   a piston base threadably connected to a lower piston portion;
   an upper check ball adapted to permit passage of component only during a piston down stroke;
   an upper check ball seat;
   a piston base washer;
   a lower packing seal; and a lower bronze bearing, whereby the lower packing assembly is adapted to be modular and replaceable in the field as a unit.

8. The apparatus of claim 7, the upper ball seat being made of tungsten nickel carbide, whereby wear and corrosive effects of the component are minimized.

9. The apparatus of claim 5, wherein the pistons are adapted to be threadably connected to the coupling yoke to reduce play between the pistons and the yoke.

10. The apparatus of claim 5, the pistons comprising:
   an upper piston portion having an internal channel for a majority of their lengths, thereby providing a relief duct for excess internal pressure and any component bypass discharge; and
   a lower piston portion.

11. The apparatus of claim 10, the lower piston portion comprising:
   a plurality of semicircular relief grooves formed on the lower piston portion outside surface; and
   an internal channel, the grooves and internal channel thereby providing a relief duct for excess internal pressure and any component bypass discharge.

12. The apparatus of claim 11, the pumps further comprising upper and lower sintered bronze bearings, said bearings having grooves adapted to release pressure and allow passage of material to the lower piston portion relief grooves, whereby the sintered bronze bearings are self-lubricating.

13. The apparatus of claim 5, further comprising:
   an upper packing nut positioned between each piston and each cylinder, the packing nut having an inside surface that is in a spaced relationship to the piston and forming a gap therebetween, whereby the gap provides an outlet for any bypass discharge or pressure and provides an inspection point that will indicate the need for packing replacement before packing failure; and
   an upper packing seal having an angled and tapered leading edge relative to its respective piston, whereby the shape of the packing seal is adapted to maximize contact with the piston and minimize the amount of component that could become lodged between the upper packing seal and nearby structures.

14. The apparatus of claim 13, wherein the upper packing seal being made of ultra-high molecular weight polyethylene.

* * * * *